United States Patent [19]

Buckfelder et al.

[11] 4,454,176

[45] Jun. 12, 1984

[54] SUPPORTED REVERSE OSMOSIS MEMBRANES

[75] Inventors: John J. Buckfelder, Wilmington, Del.; Henry M. Schleinitz, Kennett Square, Pa.

[73] Assignee: E. I. Du Pont de Nemours and Company, Wilmington, Del.

[21] Appl. No.: 434,247

[22] Filed: Oct. 14, 1982

Related U.S. Application Data

[63] Continuation-in-part of Ser. No. 313,588, Oct. 21, 1981, abandoned.

[51] Int. Cl.³ .................... B05D 5/00; B29C 23/00; B01D 39/00; B01D 39/14
[52] U.S. Cl. .................................. 427/246; 210/490; 210/500.2; 264/41; 264/46.4; 264/49
[58] Field of Search ............... 210/490, 500.2; 264/41, 264/46.4, 49; 427/246

[56] References Cited

U.S. PATENT DOCUMENTS

| 3,100,721 | 8/1963 | Holden | 427/246 |
| 3,567,632 | 3/1971 | Richter et al. | 528/68 X |
| 3,645,890 | 2/1972 | Lukach et al. | 210/500.2 X |
| 3,894,166 | 7/1975 | Brown et al. | 427/316 |
| 4,217,227 | 8/1980 | Elfert et al. | 210/500 |
| 4,221,903 | 9/1980 | Elfert et al. | 528/341 |

FOREIGN PATENT DOCUMENTS 1532459 11/1978 United Kingdom.

*Primary Examiner*—Michael R. Lusignan

[57] ABSTRACT

Preparation of supported reverse osmosis membranes on a woven, unsized, porous support using dimethylacetamide solvent and a lithium nitrate or chloride or magnesium chloride salt.

6 Claims, No Drawings

SUPPORTED REVERSE OSMOSIS MEMBRANES

CROSS-REFERENCE TO RELATED APPLICATION

This is a continuation-in-part of application Ser. No. 313,588, filed Oct. 21, 1981, now abandoned.

BACKGROUND OF THE INVENTION

Asymmetric membranes of aromatic polyamides have long been used in ultrafiltration and reverse osmosis applications. However, the mechanical properties of the membranes often require reinforcement or support, for example, with polyester fabrics or fibers, in order to prepare satisfactory reverse osmosis structures based on these membranes. Typically, a reverse osmosis membrane is formed by coating an appropriate polymer solution onto the supporting fabric. Difficulties have previously been encountered in providing a supported membrane that has both good flux and high salt rejection both as defined in Richter et al., U.S. Pat. No. 3,567,632. In addition, with the coating of extremely thin membranes, continuity of the membrane on the supporting surface is difficult to obtain. Moreover, the lack of proper adhesion between the supporting fabric and the reverse osmosis membrane can lead to delamination in use which results in the formation of blisters between the supporting fabric and the reverse osmosis membrane.

SUMMARY OF THE INVENTION

The instant invention provides an improved process for the preparation of supported reverse osmosis membranes which results in a product having excellent flux and salt rejection characteristics, membrane continuity and low blistering in operation.

Specifically, the instant invention provides, in a process for the preparation of a reverse osmosis membrane by coating a solution of aromatic polyamide, solvent, and modifying salt onto a porous support, evaporating a portion of the volatile components and coagulating the polymer in the resulting membrane in a nonsolvent for the polymer, the improvement wherein the porous support is a woven, unsized, polyester or aromatic polyamide fabric, the solvent comprises at least about 80 percent dimethylacetamide, and the modifying salt comprises about 20-60 weight percent, based on the polymer, of lithium nitrate, lithium chloride or magnesium chloride.

DETAILED DESCRIPTION OF THE INVENTION

The present invention is based on the discovery of the unique compatibility of a woven, unsized polyester or aromatic polyamide fabric, dimethylacetamide solvent and lithium nitrate, lithium chloride or magnesium chloride salts in the coating solution.

The polymers which can be used in the present invention can be those nitrogen-containing polymers described, for example, in Richter et al. U.S. Pat. No. 3,567,632, hereby incorporated by reference. Of the polymers disclosed in that patent, those having a sulfur content of about 2.0-4.5 percent are preferred, as are those polymers prepared from metaphenylenediamine, metaphenylenediamine-4-sulfonic acid and isophthalic and terephthalic acid chlorides in which the ratio of isophthaloyl chloride to terephthaloyl chloride is about 50:50 to 80:20. Within the solvent and salt requirements of the present invention, the coating solutions can be made and the membranes formed according to the usual procedures described therein.

The solvent used in the present coating solutions is dimethylacetamide. The solvent should comprise at least about 80 percent dimethylacetamide, and substantially pure dimethyacetamide is preferred. Up to about 20 percent of a wide variety of other solvent components can be present, including residual water and other solvents such as dimethylformamide, dimethylsulfoxide and dimethylpyrrolidone.

The modifying salts used in the coating solutions in the instant process should be lithium nitrate, lithium chloride, magnesium chloride or combinations thereof. These modifying salts should generally make up about 20-60 weight percent based on the polymer.

The membrane support used in the instant process is a woven, unsized polyester or aromatic polyamide fabric. Polyesters which can be used in the present invention include those described in Whinfield et al., U.S. Pat. No. 2,465,319. Of these, polyethylene terephthalate homopolymers are preferred. Aromatic polyamides which can be used include those described in Sweeny, U.S. Pat. No. 3,287,324.

Fabrics used as a support in reverse osmosis applications are preferably low in cost, stable under the operating conditions encountered in reverse osmosis operations and highly porous so as to retain high flux in operation. The support material used in the present invention is generally prepared by weaving a yarn of polyester of aromatic polyamide which has been sized with poly(acrylic acid), poly(vinyl alcohol) or linear polyester such as that commercially available from Eastman Kodak Company in a water dispersion as "W D size." After weaving into a fabric, the fabric is scoured in water at elevated temperatures, substantially completely removing the sizing originally present on the yarn. The woven cloth is then generally dried, heat set and calendered and used as the reverse osmosis membrane substrate without further sizing treatment.

A particularly satisfactory woven fabric for this purpose is that commercially available from Texlon, Inc. as "Texlon" 0715 sailcloth, woven from continuous filament "Dacron" polyester yarn. This fabric is prepared from round, fully drawn polyethylene terephthalate homopolymer fiber containing 0.3% wt. % titanium dioxide to provide a semi-dull surface. It is woven with a warp of 122 count, 70 denier yarn and a weft of 64 count, 150 denier yarn. For weaving, the yarn is sized with a linear polyester dispersed in water.

Other fabrics that have been found particularly satisfactory are "Monotex" fabrics prepared from polyethylene terephthalate monofilament and commercially available from Advance Process Supply of Pennsauken, N.J. These unsized fabrics are woven with a square weave and have the following characteristics:

| "Monotex" Designation | Count (end/inch) | Filament Diameter | Thickness (mils) | Basis Weight (gm/m$^2$) |
|---|---|---|---|---|
| 125-M | 125 | 70 | 5.2 | 58.5 |
| 180-M | 180 | 54 | 4.2 | 53.3 |
| 280-M | 280 | 38 | 2.8 | 43.3 |
| 420-M | 420 | 33 | 2.8 | 46.4 |

Still another fabric that can be used is that prepared from continuous filament "Nomex" aramid fiber and commercially available from Stern & Stern Textiles, Inc. These fabrics are woven from continuous filament yarn, scoured to remove the sizing originally present on the yarn and heat set. The fabrics have the following characteristics:

| Weave | Filament Count Warp | Weft | "Nomex" Designation | Thickness (mils) | Basis Weight (gm/m$^2$) |
|---|---|---|---|---|---|
| 2 × 2 Basket | 101 | 92 | HT-1-41 | 9.9 | 179 |
| Plain | 61 | 48 | HT-10/41 | 13.5 | 210 |
| Satin | 103 | 80 | HT-45/55 | 10.1 | 164 |
| 2 × 2 Chain | 100 | 86 | HT-48/48 | 11.4 | 171 |
| Plain | 45 | 45 | HT-6/42 | 6.1 | 82 |

The final polymer coating solution generally contains about from 16 to 21 pecent polymer, based on the total solution, and further comprises about from 60 to 20 percent of the modifying salt, based on weight of the polymer. In general, increasing concentrations of salt result in higher flux in the finished membrane, while lesser amounts of salt increase the rejection rate of the membrane. While the viscosity of the polymer coating solution can vary widely, it is generally about from 100 to 400 poise to provide convenient handling characteristics and little tendency to permeate the support fabric. The coating solution further comprises minor quantities of additives typically used in such polymer coating solutions. For example, about 800 parts per million of polyethylene glycol monostearate typically improves the flux of the final membrane without significant depreciation of selectivity.

After coating the solution onto the woven substrate, evaporating a portion of the volatile components and coagulating the polymer in a nonsolvent according to usual techniques, the resulting membrane can be further improved by chemical treatment, such as contacting the membrane with a dilute aqueous solution of about 100 parts per million of polyvinyl methyl ether.

After coating the reverse osmosis membrane onto the porous support, it is preferably annealed to improve the stability of the supported membrane in use. Despite an initial reduction in flux resulting from such annealing, less change in flux over extended operation is realized. Annealing is typically conducted in water at elevated temperatures of about from 50° to 75° C. for a period of about from 15 to 60 minutes.

The membranes resulting from the process of the instant invention exhibit an excellent combination of flux and salt rejection, combined with a low propensity toward delamination or blister formation. In this regard, the membranes resulting from the instant process are substantially better in both flux and salt rejection than unsized nonwoven supports and fully equivalent to sized nonwoven supports without the inconvenience and expense of an additional sizing step. The present membranes can exhibit a flux as high as 3.7 m/s.TPa or greater and a salt rejection as high as 97 percent or more. By contrast, high flux and salt rejection do not seem to be realized when different solvents or different salts are used in the membrane coating solution with the same woven support fabrics.

The invention is further illustrated by the following specific examples. In these examples, the polymer used was an aromatic copolyamide of metaphenylenediamine and isophthalic and terephthalic acids made according to the formulations and procedures described in Richter et al., U.S. Pat. No. 3,567,632.

EXAMPLES 1 TO 14 AND COMPARATIVE EXAMPLES A TO K

In Examples 1 to 14 and Comparative Examples A to K, polymers were used which were prepared from metaphenylenediamine (MPD), metaphenylenediamine-4-sulfonic acid (HSMPD), isophthaloyl chloride (ICl) and terephthaloyl chloride (TCl). The ratios of MPD and HSMPD were varied to provide a sulfur content in the final polymer of 2.5 to 3.4 weight percent, while the ratio of ICl and TCl was varied to provide a ratio of between 50:50 to 80:20. The polymer composition used in Examples 1 to 14 and Comparative Examples A to K is indicated in Table 1A.

TABLE 1A

| Example | ICl/TCl Ratio (moles) | % Sulfur | MPD/HSMPD Ratio (moles) |
|---|---|---|---|
| 1 | 50:50 | 3.4 | 72/28 |
| 2 | 50:50 | 3.4 | 72/28 |
| 3 | 50:50 | 3.4 | 72/28 |
| 4 | 60:40 | 2.5 | 80/20 |
| 5 | 60:40 | 2.5 | 80/20 |
| 6 | 60:40 | 2.5 | 80/20 |
| 7 | 70:30 | 2.5 | 80/20 |
| 8 | 70:30 | 2.5 | 80/20 |
| 9 | 80:20 | 3.0 | 76/24 |
| 10 | 80:20 | 3.0 | 76/24 |
| 11 | 80:20 | 3.0 | 76/24 |
| 12 | 80:20 | 2.5 | 80/20 |
| 13 | 80:20 | 2.5 | 80/20 |
| 14 | 80:20 | 2.5 | 80/20 |
| A | 70:30 | 2.5 | 80/20. |
| B | 70:30 | 2.5 | 80/20 |
| C | 70:30 | 2.5 | 80/20 |
| D | 70:30 | 2.5 | 80/20 |
| E | 70:30 | 2.5 | 80/20 |
| F | 70:30 | 2.5 | 80/20 |
| G | 70:30 | 2.5 | 80/20 |
| H | 70:30 | 2.5 | 80/20 |
| I | 70:30 | 2.5 | 80/20 |
| J | 70:30 | 2.5 | 80/20 |
| K | 70:30 | 2.5 | 80/20 |

Membrane coating solutions were prepared from the polymer, solvent and modifying salt in the concentrations indicated in Table 1B. The solutions were coated onto a fabric support of the type indicated in Table 1B. The resulting membrane was dried, cooled, gelled and substantially fully extracted. In Example 7, the membrane was annealed at 50° C. for 30 minutes and post-treated with a dilute solution of polyvinyl methyl ether.

The supported membranes were evaluated for flux and salt rejection characteristics. The results of these tests, together with the process conditions used for each example, are summarized in Table 1B.

TABLE IB

| Example | Base | Sizing | Solvent | Polymer Conc. Wt % | Salt | Salt Conc. Wt % (BOP) | Coated Film Thick mils. | Drying Temp. °F. | Drying Time min. | At 420 psi kw m/s.TPa | Rej. % | Comment |
|---|---|---|---|---|---|---|---|---|---|---|---|---|
| 1 | Texlon[1] | None | DMAC[a] | 20 | LiNO$_3$ | 25 | 9.7 | 215 | 12 | 3.2 | 83.9 | |
| 2 | Texlon | None | DMAC | 20 | LiNO$_3$ | 50 | 8.9 | 215 | 12 | 5.2 | 89.7 | |

TABLE IB-continued

| | | | | | | | Wet Film Thick mils. | Drying Temp. °F. | Drying Time min. | kw m/s.TPa | Rej. % | |
|---|---|---|---|---|---|---|---|---|---|---|---|---|
| 3 | Texlon | None | DMAC | 20 | LiNO3 | 40 | 9.1 | 215 | 12 | 3.7 | 92.2 | |
| 4 | Texlon | None | DMAC | 18 | LiNO3 | 10 | 8.3 | 215 | 12 | .5 | 98.2 | tested 800 psi |
| 5 | Texlon | None | DMAC | 18 | LiNO3 | 50 | 8.1 | 215 | 12 | 3.8 | 93.1 | |
| 6 | Texlon | None | DMAC | 18 | LiNO3 | 40 | 9.5 | 215 | 12 | 3.2 | 95.5 | |
| 7 | Texlon | None | DMAC | 17 | LiNO3 | 49 | 6.7 | 200 | 5.0 | 4.15 | 94.8 | No blisters |
| | | | | | | | | | | 3.1 | 95.4 | Annealed 30'/50° C. |
| | | | | | | | | | | 1.9 | 97.8 | Chem. Post treatment |
| 8 | Texlon | None | DMAC | 17 | LiNO3 | 49 | 7.5 | 210 | 3.4 | 3.46 | 95.2 | No blisters |
| 9 | Texlon | None | DMAC | 20 | LiNO3 | 60 | 10.2 | 215 | 12 | 4.1 | 90.3 | |
| 10 | Texlon | None | DMAC | 20 | LiNO3 | 40 | 8.8 | 215 | 12 | 3.6 | 87.2 | |
| 11 | Texlon | None | DMAC | 20 | LiNO3 | 25 | 8.9 | 215 | 12 | 2.6 | 91.9 | |
| 12 | Texlon | None | DMAC | 20 | LiNO3 | 25 | 7.9 | 215 | 12 | 2.4 | 95.6 | |
| 13 | Texlon | None | DMAC | 20 | LiNO3 | 40 | 8.3 | 215 | 12 | 3.8 | 93.6 | |
| 14 | Texlon | None | DMAC | 20 | LiNO3 | 60 | 9.1 | 215 | 12 | 4.7 | 88.9 | |

| Example | Base | Sizing | Solvent | Polymer Conc. Wt % | Salt | Salt Conc. Wt % (BOP) | Wet Film Thick mils. | Drying Temp. °F. | Drying Time min. | kw m/s.TPa | Rej. % | Comment |
|---|---|---|---|---|---|---|---|---|---|---|---|---|
| A | Texlon | None | DMF[10] | 16 | MgCl2 | 39[8] | 6.9 | 210 | 3.4 | 2.8 | 84.7 | No blisters |
| B | 3329[2] | PAA[7] | DMAC | 17 | LiNO3 | 48 | 7.0 | 191 | 4.2 | 4.1 | 90.7 | No blisters |
| | | | | | | | | | | 3.0 | 93.7 | Annealed 30'/55° C. |
| C | 3329 | None | DMAC | 17 | LiNO3 | 48 | 7.0 | 191 | 4.2 | — | — | Profuse blisters |
| D | 3329 | PAA | DMAC | 16.94 | LiNO3 | 49.53 | 6.8 | 212 | 4.5 | 3.4 | 96.7 | No blisters |
| | | | | | | | | | | 2.9 | 97.1 | Annealed |
| E | 3329 | PAA[7] | DMF | 17.78 | MgCl2 | 30.46[8] | 6.6 | 192 | 4.2 | 5.4 | 92.9 | No blisters |
| | | | | | | | | | | 4.8 | 93.2 | Annealed |
| F | 3329 | None | DMF | 16.18 | MgCl2 | 39.05[8] | 7.9 | 193 | 3.4 | 0.84 | 32.5 | No blisters |
| G | Pellon[3] | None | DMAC | 18.0 | LiNO3 | 50.0 | 5.9 | 194 | 2.4 | 2.6 | 84.5 | Blistered |
| H | 3329 | None | DMAC | 18.0 | LiNO3 | 50.0 | 7.9 | 193 | 3.4 | 5.78 | 91.9 | Blisters |
| I | 3361[4] | None | DMAC | 18.0 | LiNO3 | 50.0 | 7.9 | 193 | 3.4 | 2.78 | 93.4 | Blisters |
| J | 3264[5] | None | DMAC | 16.7 | LiNO3 | 49.61 | 7.8 | 203 | 3.4 | 4.1 | 95.0 | Blisters |
| K | Powell[6] | None | DMAC | 16.7 | LiNO3 | 49.61 | 6.9 | 203 | 3.4 | — | | Profuse blisters |

Notes to Table IB:
[1]"Texlon" 0715 sailcloth, scoured to remove sizing originally present on the yarn, dried, heat set and calendered; commercially available from Texlon, Inc.
[2]"Hollytex" 3329, calendered spunbonded polyester; commercially available from Eaton-Dikeman
[3]"Pellon" 6800, resin-bonded polyester; commercially available from Pellon
[4]"Hollytex" 3361, calendered spunbonded polyester; commercially available from Eaton-Dikeman
[5]"Hollytex" 3254, calendered spunbonded polyester; commercially available from Eaton-Dikeman
[6]Powell High Density Fabric, resin-bonded polyester; commercially available from Powell
[7]Polyacrylic acid sodium salt neutralized to pH 5.0, molecular weight less than 50,000, "Acrysol A-1", commercially available from Rohm and Haas
[8]Anhydrous MgCl2 concentration; salt added as hexahydrate
[9]Dimethylacetamide
[10]Dimethylformamide The data demonstrate that excellent supported membranes can be prepared on unsized woven supports, in which the membranes exhibit excellent flux and salt rejection with no blister formation. The use of magnesium chloride salt and dimethylformamide in Comparative Example A instead of the lithium salt resulted in low flux and salt rejection. The use of a sized support fabric in Comparative Example B resulted in a satisfactory membrane with no blister formation with high water flux but only fair to good salt rejection. The use of unsized unwoven support fabric in Comparative Example C resulted in profuse blistering with very low salt rejection. The use of a similar, but sized support in Comparative Example D resulted in high flux and high salt rejection. In Comparative Example E, a membrane was produced having good salt rejection and high flux, but with the necessity of a sizing for the nonwoven support fabric. Elimination of the sizing in Comparative Example F resulted in a product having very low flux and salt rejection characteristics. In Comparative Examples G to K, the use of unsized nonwoven support fabrics resulted in blistering in each case.

EXAMPLES 15 TO 29 AND COMPARATIVE EXAMPLES L TO Q

In Examples 15 to 29 and Comparative Examples L to Q, the general procedure of Examples 1 to 14 was repeated, using the "Texlon" unsized base with DMAC solvent. Lithium nitrate salt was used in the coating solution at the concentrations indicated. The ratio of MPD to HSMPD in the polymer preparation was varied to provide a sulfur content in the final polymer ranging from 2.5 to 4.3 weight percent. The resulting polymers were coated onto a fabric support and evaluated as in Examples 1 to 14. The results are summarized in Table II.

TABLE II

| Example | Polymer Conc. Wt. % | Salt Conc. Wt. % (BOP) | % Sulfur | MPD/HSMPD Ratio | Coated Film Thick mils. | Drying Temp. °F. | Drying Time min. | At 420 psi kw m/s.TPa | Rej. % | Comments |
|---|---|---|---|---|---|---|---|---|---|---|
| 15 | 17 | 50 | 2.5 | 80/20 | 10.5 | 215 | 10 | 3.9 | 95.8 | |
| 16 | 17 | 50 | 2.5 | 80/20 | 6.1 | 175 | 10 | 3.9 | 95.3 | |
| 17 | 17 | 50 | 2.5 | 80/20 | 6.3 | 175 | 15 | 3.9 | 95.8 | |
| 18 | 17 | 50 | 2.5 | 80/20 | 6.5 | 200 | 5 | 2.1 | 95.6 | |
| 19 | 17 | 50 | 2.5 | 80/20 | 7.1 | 215 | 5 | 3.7 | 95.1 | |
| 20 | 18 | 50 | 2.5 | 80/20 | 9.5 | 215 | 12 | 4.9 | 87.6 | |
| 21 | 18 | 40 | 3.0 | 76/24 | 9.4 | 215 | 12 | 3.3 | 95.0 | |
| 22 | 18 | 25 | 3.4 | 72/28 | 10.1 | 215 | 12 | 3.0 | 92.5 | |
| 23 | 18 | 40 | 3.4 | 72/28 | 9.3 | 215 | 12 | 3.4 | 91.8 | |

TABLE II-continued

| Example | Polymer Conc. Wt. % | Salt Conc. Wt. % (BOP) | % Sulfur | MPD/HSMPD Ratio | Coated Film Thick mils. | Drying Temp. °F. | Drying Time min. | At 420 psi kw m/s.TPa | Rej. % | Comments |
|---|---|---|---|---|---|---|---|---|---|---|
| 24 | 18 | 60 | 3.4 | 72/28 | 8.7 | 215 | 12 | 4.6 | 86.8 | |
| 25 | 20 | 25 | 4.3 | 64/36 | 9.9 | 215 | 12 | 1.9 | 85.1 | |
| 26 | 20 | 50 | 4.3 | 64/36 | 9.3 | 215 | 12 | 3.3 | 74.2 | |
| 27 | 20 | 25 | 4.3 | 64/36 | 8.7 | 215 | 12 | 2.1 | 96.1 | made with poly- |
| 28 | 20 | 40 | 4.3 | 64/36 | 9.2 | 215 | 12 | 4.9 | 95.2 | mer 50% neutra- |
| 29 | 20 | 25 | 4.3 | 64/36 | 9.5 | 215 | 10 | 2.9 | 96.2 | lized with CaO |
| L | 18 | 10 | 2.5 | 80/20 | 8.2 | 215 | 12 | .5 | 96.1 | tested 800 psi |
| M | 18 | 75 | 2.5 | 80/20 | 10.5 | 215 | 12 | 5.1 | 86.1 | |
| N | 18 | 10 | 3.0 | 76/24 | 7.3 | 215 | 12 | 1.5 | 85.5 | |
| O | 18 | 75 | 3.0 | 76/24 | 9.4 | 215 | 12 | 11.4 | 29.7 | tested 600 psi |
| P | 18 | 10 | 3.4 | 72/28 | 7.4 | 215 | 12 | .5 | 96.1 | tested 800 psi |
| Q | 18 | 75 | 3.4 | 72/28 | 8.9 | 215 | 12 | fast | 15 | |

EXAMPLES 30 TO 36

The general procedure of Examples 1 to 14 is repeated, except that in Examples 30 to 32 the polymer was coated onto an unsized sheet of a fabric prepared from continuous filament "Nomex" aramid fiber commercially available from Stern and Stern Textiles Inc. as HT-10-41, and in Examples 33 to 36 the polymer was coated onto an unsized sheet of "Monotex" fabric prepared from polyester monofilament and commercially available from Advance Process Supply Co. of Pennsauken, New Jersey, as 420 M, 280 M, 180 M and 420 M, respectively. The solvent used was DMAC and lithium nitrate salt was added to the solution. The resulting supported membranes were evaluated for flux and salt rejection characteristics. The polymer composition and test results are summarized in Table III.

TABLE III

| Example | Polymer Conc. Wt. % | Salt Conc. Wt. % (BOP) | % Sulfur | MPD/HSMPD Ratio | Coated Film Thick mils. | Drying Temp. °F. | Drying Time min. | At 420 psi kw m/s.TPa | Rej. % |
|---|---|---|---|---|---|---|---|---|---|
| 30 | 18 | 40 | 3.0 | 76/24 | 16.2 | 215 | 15 | 3.0 | 94.5 |
| 31 | 20 | 40 | 4.3 | 64/36 | 18.0 | 215 | 15 | 3.6 | 92.8 |
| 32 | 18 | 40 | 3.4 | 72/28 | 15.1 | 215 | 15 | 2.9 | 89.6 |
| 33 | 17 | 50 | 2.5 | 80/20 | 5.3 | 215 | 12 | 4.3 | 91.1 |
| 34 | 17 | 50 | 2.5 | 80/20 | 5.2 | 215 | 15 | 3.4 | 94.9 |
| 35 | 17 | 50 | 2.5 | 80/20 | 7.7 | 215 | 15 | — | — |
| 36 | 17 | 50 | 2.5 | 80/20 | 5.4 | 215 | 15 | 2.9 | 92.6 |

EXAMPLES 37 TO 42

In Examples 37 to 42, the general procedure of Examples 1 to 14 was repeated, except that the polymers used are those shown in Table IVA.

TABLE IVA

| Example | Amine(s) | Amine Ratio | Acid(s) | ICl/TCl Ratio |
|---|---|---|---|---|
| 37 | H2N–[cyclohexane]–C(=O)NHNH2 , H2NNHC(=O)–[cyclohexane]–C(=O)NHNH2 | 50/50 | ICl/TCl | 70/30 |
| 38 | H2N–[cyclohexane]–C(=O)NHNH2 | — | ICl | — |
| 39 | H2NNHC(=O)–[cyclohexane]–O–CH2CH2CH2–O–[cyclohexane]–C(=O)–NHNH2 | — | ICl/TCl | 70/30 |
| 40 | H2NNHC(=O)–[cyclohexane]–O–CH2CH2–O–[cyclohexane]–C(=O)–NHNH2 | — | ICl/TCl | 70/30 |
| 41 | NH2–[cyclohexane]–NH2 | — | TCl | — |

TABLE IVA-continued

| Example | Amine(s) | Amine Ratio | Acid(s) | ICl/TCl Ratio |
|---|---|---|---|---|
| 42 | H₂NHN-⌬-NHNH₂   H₂N-⌬-O-⌬-NH₂ | 50/50 | ICl/TCl | 70/30 |

The polymers were coated onto unsized "Texlon" fabric using DMAC solvent and lithium nitrate salt. The supported membranes were evaluated for flux and salt rejection characteristics. The results of these tests, together with the process conditions used for each example, are summarized in Table IV.

TABLE IV

| Example | Polymer Conc. Wt. % | Salt Conc. Wt. % (BOP) | Coated Film Thick mils. | Drying Temp. °F. | Drying Time min. | Rej. % | At 420 psi kw m/s.TPa | Comments |
|---|---|---|---|---|---|---|---|---|
| 37 | 18.9 | 30 | 11.0 | 215 | 12 | 93.1 | 3.4 | |
| 38 | 20 | 40 | 8.5 | 215 | 12 | 42.5 | 6.1 | |
| 39 | 16.6 | 50 | 10.1 | 215 | 12 | 94.9 | .9 | |
| 40 | 16.6 | 30 | 7.5 | 215 | 12 | 98.9 | 1.5 | |
| 41 | 20 | 40 | 10.7 | 215 | 12 | 89.2 | 1.9 | |
| 42 | 20 | 40 | 8.1 | 215 | 12 | — | — | No rejection |

We claim:

1. In a process for the preparation of a reverse osmosis membrane by coating a solution of aromatic polyamide, solvent, and modifying salt onto a porous support, evaporating a portion of the solvent and coagulating the aromatic polyamide in the resulting membrane in a nonsolvent for the aromatic polyamide, the improvement wherein the porous support is a woven, unsized, polyester or aromatic polyamide fabric, the solvent in the solution comprises at least about 80 percent dimethylacetamide, the modifying salt comprises about 20-60 weight percent, based on the aromatic polyamide in solution, of lithium nitrate, lithium chloride or magnesium chloride, and the solution, as it is coated onto the support, exhibits a viscosity of 100 to 400 poise with little tendency to permeate the support fabric.

2. A process for claim 1 wherein the woven fabric is polyester.

3. A process of claim 2 wherein the polyester is polyethylene terephthalate.

4. A process for claim 1 wherein the modifying salt consists essentially of lithium nitrate.

5. A process for claim 1 further comprising annealing the resulting supported membrane in water at a temperature of about 50°-75° C. for a period of about 15-60 minutes.

6. A process of claim 5 further comprising contacting the supported membrane with an aqueous solution of about 100 ppm polyvinyl methyl ether.

* * * * *